Feb. 1, 1949.  N. J. RILEY  2,460,311

TWO-PIECE WELDING PIPE FLANGE

Filed Aug. 11, 1945

INVENTOR
Neil J. Riley
BY
Carl Miller
ATTORNEY

Patented Feb. 1, 1949

2,460,311

UNITED STATES PATENT OFFICE 2,460,311

TWO-PIECE WELDING PIPE FLANGE

Neil J. Riley, Lyndhurst, N. J.

Application August 11, 1945, Serial No. 610,286

1 Claim. (Cl. 285—130)

This invention relates to improvements in a joint for pipes, and one of the objects of the invention is to provide a welded joint, one side of which is constructed of two pieces, one piece forming a centering cone and the other piece a floating ring having a conical central hole to engage the centering cone, and means for bolting the same to a companion pipe flange.

Another object of the invention is to provide a two piece pipe end coupling means, wherein the end of the pipe is equipped with a centering cone having its inner and outer ends welded directly to the carrying pipe, and the companion piece is unattached to the pipe, and is constructed to have a conical bearing on the centering cone, and then be bolted directly to a companion pipe flange of another pipe end.

With the above and other objects in view the invention comprises certain new and useful constructions, combinations, and arrangements of parts, clearly described in the following specification, and fully illustrated in the accompanying drawings, in which.

Figure 1:
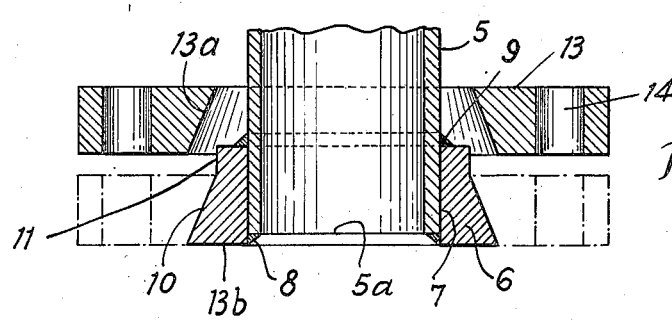
Fig. 1 is a central longitudinal sectional view, showing the flange ring separated from the welded centering cone in full lines, and in its coupling position in dotted lines.
Figure 3:
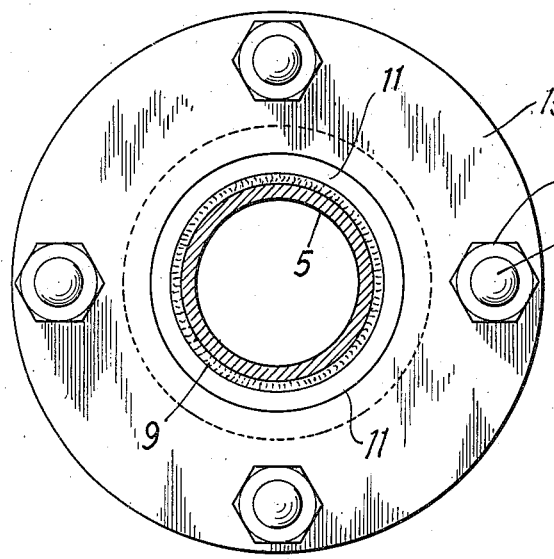
Fig. 3 is a sectional view, taken on line 3—3 of Fig. 2, looking in the direction of the arrows.
Figure 2:
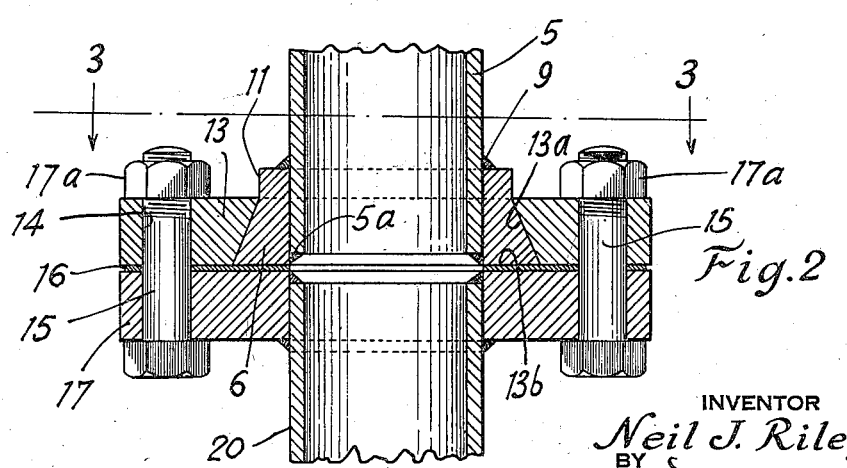
Fig. 2 is a similar view, showing the complete welded flange joint, formed between two pipe ends.

Referring to the accompanying drawings which illustrate the practical embodiment of the invention, 5 designates a fragmentary part of a steel or metal pipe end, which is enclosed by the centering ring 6, which is formed with a cylindrical bore wall 7 to match the cylindrical outer surface of the pipe 5. This wall is extended endwise of the end 5a of the pipe 5, and is welded at 8 to the pipe. The inner end of the ring 6 is also welded at 9 to the pipe 5.

The outer surface of the ring 6 is formed conical at 10, with the larger end of the cone disposed at the outer end ring. The inner end of the cone is disposed inwardly of the inner end of the ring, and a short cylindrical portion 11 is formed on the inner end of the ring 6.

When welded to the pipe 5 the centering ring 6 is concentrically and permanently united to the pipe 5, and the outer end 12 of the ring 6 is formed flat and disposed at right angles to the axis of the pipe and the ring 6.

The centering ring 6 is adapted to receive the flange ring 13, which is formed with a conical central hole 13a, which has a matching frictional bearing engagement with the external surface of the cone 10. This ring 13 is not directly connected with the conical centering ring 6, and is formed with a series of equally spaced bolt holes 14, through which the connecting bolts 15 are extended.

The outer face 13b of the ring 13 is formed with a flat inner face which is adapted to have pressure bearing engagement on the gasket 16, which seals the joint between the confronting faces of the centering ring, the flange ring 13, and the pipe flange 17, which is welded at 18 and 19 to the pipe section or end 20.

The pipe flange ring 17 is disposed concentric of the pipe end 20, and the external diameter of the flange ring 17 is shown to be equal to the external diameter of the flange ring 13. The bolts 15 extend also through the flange ring 17, and nuts 17a are threaded on these bolts to clamp the ring 13 against the ring 17, the conical bearing of the ring 13 on the ring 6 forces the flange ring 17 into concentric relation with the ring 13, and thereby centers the pipe end 20 with reference to the pipe end 5, so that minimum joint resistance to the flow of steam or fluid through the pipes will be obtained.

The tension developed by tightening the nuts on the bolts is equally distributed by the ring 13 upon the centering ring 6 and the pipe end 5, and the meeting faces between the confronting flanges of the pipe joints are effectively sealed by the equal pressure developed upon the gasket 16, so that leakage is prevented from the pipe ends.

It is understood that various changes in the use of material, the change in proportions shown, and in the details of construction, may be resorted to, within the scope of this invention, as defined by the claim hereof.

Having described my invention, I claim:

A pipe coupling, comprising in combination, a pair of pipe ends, a flange ring mounted concentrically on one of the pipe ends and projecting outwardly thereof and welded directly to the pipe end and also welded to the side of the pipe on opposite sides of said flange ring, a conical collar mounted concentrically on the other pipe end and projecting outwardly thereof and welded directly to the end engaged on one side of the conical collar and welded directly to the engaged pipe end on the other side of the flange collar, the wider end of said conical collar being disposed outwardly of the engaged pipe end, a flange forming ring having a conical bore having a matching fit with the conical collar, said first-named flange ring and said flange forming ring having registerable bolt holes, a gasket disposed between the outer end of the first-named flange ring and the outer end of the flange forming ring and engaged by both said rings, bolts extending through the bolt holes and nuts threaded on the bolts to clamp said rings against the gasket and to hold the confronting ends of said first-named flange ring and the conical collar under pressure engagement with the opposite faces of the gasket.

NEIL J. RILEY.

REFERENCES CITED

The following references are of record in the file of this patent:

UNITED STATES PATENTS

| Number | Name | Date |
|---|---|---|
| 2,299,813 | Franks | Oct. 27, 1942 |

FOREIGN PATENTS

| Number | Country | Date |
|---|---|---|
| 679,903 | Germany | July 27, 1939 |